Feb. 16, 1965    J. RÖDER ETAL    3,169,757
HOLDING AND GRIPPING DEVICE FOR TENSION-COMPRESSION SPRINGS
Filed June 19, 1962    2 Sheets-Sheet 2
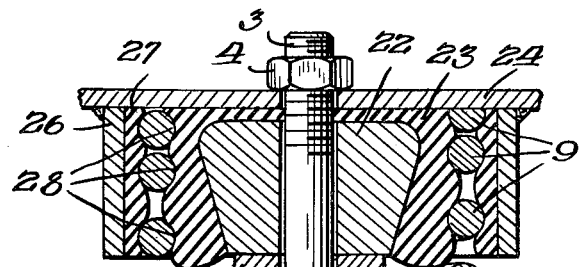
Fig. 3.
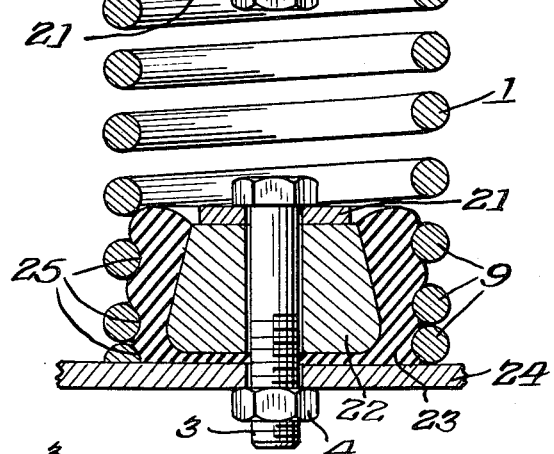
Fig. 4.
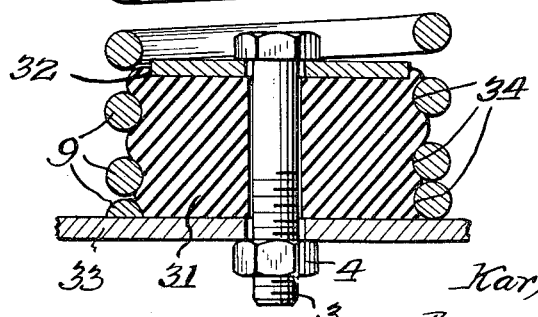
INVENTORS
JÖSEF RODER
GEORG KLEIN
KARL-HEINZ KÜNZEL
PAUL KRÜGER
Karl-Heinz Künzel.
By  S. Lee & S. Lee Attys.

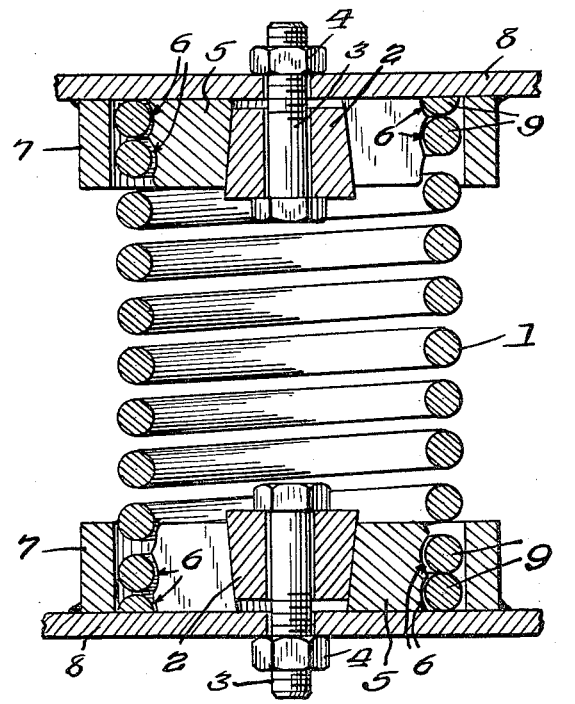

United States Patent Office 3,169,757
Patented Feb. 16, 1965

3,169,757
HOLDING AND GRIPPING DEVICE FOR TENSION-COMPRESSION SPRINGS
Josef Röder and Georg Klein, Darmstadt, Karl-Heinz Künzel, Darmstadt-Eberstadt, and Paul Krüger, Darmstadt-Arheilgen, Germany, assignors to Carl Schenck Maschinenfabrik G.m.b.H., Darmstadt, Germany, a German company
Filed June 19, 1962, Ser. No. 203,568
Claims priority, application Germany, June 24, 1961, Sch 29,910
7 Claims. (Cl. 267—60)

The invention disclosed herein is concerned with a holding and gripping device for springs, for example, helical springs or springs of the frustum type, which are subjected to tension and to compression.

While a spring which is only subjected to compression may lie relatively loosely in holding plates provided therefor, a spring which is subjected to tension and to compression, must be firmly held and gripped at the ends thereof. It is known to wind the terminal ends of a tension spring on a suitable mandrel-like or similar gripping member which is provided with grooves formed therein, the corresponding turns of the spring lying in the grooves secured against slippage, being thus firmly gripped in fixed position thereof. In the actuation of such fixedly gripped springs, the shearing stresses become fully operative at the fixedly gripped wire. This increases the danger of spring breakage, and tension-compression springs provided with such holding and gripping devices have therefore not gained favor in practical use.

The object of the present invention is to provide a spring holding and gripping device which avoids the drawbacks of the previously known devices.

According to the invention, this object is realized by the provision of a spring holding and gripping device which is so constructed that the reactive forces, exerted by the gripping device on the spring turns which are being gripped, and acting counter to the spring loading, diminish progressively in the direction of the spring turns which are not being gripped.

In a holding and gripping device constructed in this manner, the transition of the shearing stresses acting on the spring wire responsive to the load, as well as the pressure stresses exerted by the gripping device, do not operate suddenly but gradually progressively, the consequently more favorable stress distribution reducing to a great extent the danger of spring breakage.

The spring holding and gripping device according to an embodiment of the present invention, comprises a gripping ring formed of a plurality of parts and disposed within the spring turns to be gripped, such ring forming grooves for receiving the corresponding spring turns, said grooves becoming wider and flatter in the direction of the part of the spring which is not being gripped, and means for tensioning the ring with respect to the gripped spring turns, so as to apply radial pressure thereto. A screw device is advantageously used as a tensioning means, cooperating with a centrally disposed conical ring which is pressed into the gripping ring so as to spread such ring radially apart to apply pressure to the corresponding spring turns. The configuration of the grooves which receive the spring turns secures the progressively gradual transition of the shearing stress.

The inwardly gripped spring turns are radially outwardly surrounded by a fixed tubular member to which is attached a radially extending plate-like member forming therewith a cup-shaped spring holder.

In accordance with another feature of the invention, an outer tensioning or spring gripping ring may be used in place of the above noted cup-shaped holder, and an outer conical ring may be employed for cooperation with such outer ring to tension the latter radially inwardly against the spring turns lying in complemental grooves formed on the inside of the outer ring, which grooves likewise become wider and flatter in the direction of the spring part which is not being gripped.

In accordance with a further embodiment of the invention, there is provided a resilient body, for example, a rubber body, disposed within the spring turns which are to be gripped, said rubber body having a wedge-shaped core of solid material, for example, a core made of iron. The wedge shaped core is embedded in the rubber body and is adjustable with respect thereto, so that the gripping forces exerted by the rubber on the corresponding spring turns diminish in the direction of the spring turns which are not being gripped.

It is in accordance with still another embodiment possible to use a spring gripping member of rubber without the rigid core.

The spring gripping rubber member may in some situations be provided with grooves for receiving the corresponding spring turns, such structure being indicated, for example, upon using relatively hard rubber or a spring made of softer material.

Details of the invention will now be described with reference to the accompanying drawings, showing embodiments thereof.

FIG. 1 shows an embodiment using an inner tensioning member made of a plurality of parts, which may be radially spread apart or expanded to apply gripping pressure to spring turns to be gripped;

FIG. 2 represents an embodiment employing in addition to the inner tensioning or spring gripping member an outer complemental annular spring gripping member made of a plurality of parts, and means for radially inwardly tensioning or contracting such outer member to apply gripping pressure to the corresponding turns of a spring;

FIG. 3 indicates an embodiment employing a rubber member for gripping the turns of a spring, said rubber member having a core of rigid material for adjusting the spring gripping pressure; and FIG. 4 shows an embodiment likewise utilizing a rubber body for gripping turns of a spring, omitting the core of rigid material, and having means for adjusting the gripping pressure of the rubber body.

The illustrated examples of the invention show devices for holding and gripping cylindrical helical springs. However, the invention is likewise applicable in connection with other kinds of springs, for example, springs in the shape of a frustum or the like. If desired, two springs, for example, two frustum springs, may be interconnected, for example, serially connected, by the gripping device made according to the invention. Identical parts are identically referenced throughout the drawings.

The embodiment shown in FIG. 1 comprises a tubular conical tensioning or adjusting member 2, through the bore of which extends a screw device serving as an adjusting means, such device comprising a threaded bolt 3 and a nut 4. The tubular conical tensioning member 2 cooperates with a tensioning or spring gripping ring 5 which is preferably made of three parts which are provided on the outside thereof with thread-like grooves 6 conforming to the pitch of the terminal turns 9 of the spring 1. The grooves 6 become progressively broader and flatter in axially inward direction, that is, in the direction of the part of the spring 1 which is not being gripped, the axially innermost groove being practically totally ground off. The radially inwardly facing sides of the turns 9 of the spring 1 lie in the respective grooves 6, while such turns are on the radially outwardly facing sides thereof in engagement with the inner wall of a fixed tubular member 7, the latter being connected with a plate-like member 8 and forming with such plate like member the holder for the spring 1. Responsive to a compression force, acting on the spring 1, the spring turns 9 will be in more or less pressure engagement with the flanks of the respective grooves 6 which face toward the holder plate 8. Responsive to tensile force acting on the spring 1, the spring turns 9 will be in pressure engagement with the flanks of the grooves 6 which face away from the plate 8 or axially inwardly of the structure.

Referring now to FIG. 2, and particularly to the spring holding and gripping device shown at the bottom thereof, there is provided a centrally disposed tensioning or spring gripping ring 5, again comprising a plurality of parts, which may be radially expanded by the action of the conical member 2, which is axially adjustable by the screw device 3, 4, cooperating with the pressure plate 11, to apply radially outwardly effective pressure force to the radially inwardly facing sides of the spring turns 9. An outer tensioning or spring gripping ring 12, likewise comprising a plurality of parts, preferably three parts, surrounds the spring turns 9 on the outside thereof. The outer spring gripping ring 12 is provided with angular radially outwardly facing surfaces which are in cooperative engagement with correspondingly angularly shaped inner walls of a fixed outer ring 16 through the bores of which extend screw devices comprising respectively threaded bolts 14 and nuts 15. The bolts 14 act upon the outer ring 12 through the medium of an axially inwardly disposed pressure plate 18, causing the spring gripping ring 12 to contract radially inwardly so as to exert a supplemental gripping force on the spring turns 9. The fixed ring 16 is fastened to the holder plate 17.

The spring holding and gripping device shown at the top of FIG. 2 corresponds generally to the above described gripping device shown at the bottom of the figure, except that both, the inner spring gripping ring 5 and the outer spring gripping ring 12 are provided with grooves respectively indicated at 6 and 13, for receiving the spring turns 9 to be gripped. The grooves again become wider and flatter axially inwardly or toward the part of the spring 1 which is not being gripped.

The spring holding and gripping device indicated in FIG. 3 comprises a rubber body 23 having a core 22 of rigid material, for example, iron or the like. The gripping force exerted by the rubber body 23 on the spring turns 9 may be adjusted by means of a screw device comprising, for example, a threaded bolt 3 and a nut 4. The force produced by the screw device is transmitted to the core 22 by the pressure plate 21. Tightening of the nut 4 presses the rubber body 23 radially outwardly. The spring turns 9 of the spring 1 produce in the rubber body 23 grooves 25 for holding the spring turns 9.

The spring holding and gripping structure shown in the upper part of FIG. 3 comprises a platelike member 24 provided with a tubular member 26 fixedly attached thereto, such member being provided with a rubber lining 27 into which the spring turns 9 are pressed depending on the force exerted upon such spring turns by the inner rubber body 23.

The embodiment according to FIG. 4 utilizes a rubber body 31 as a spring gripping and tensioning element. The core 22 of rigid material, used in FIG. 3, is omitted in the embodiment according to FIG. 4. The force produced by the screw device 3, 4 acts through the medium of the pressure plate 32 directly on the rubber body 31 to cause lateral deformation of such rubber body so as to exert pressure against the spring turns 9 which nestle in grooves 34 produced thereby.

As shown in the top part of FIG. 4, there may again be provided a fixed outer tubular member 35 lined with rubber as indicated at 36. The lateral pressure exerted on the spring turns 9 by the rubber body 31 presses these spring turns into the rubber lining 36, thus producing in such lining grooves 37 in which the spring turns are gripped. The tubular member 35 is fixedly attached to the plate 33, for example, by welding.

The rubber bodies 23 and 31 shown respectively in FIGS. 3 and 4, may be made of relatively soft material. The rigid core 22 (FIG. 3) must be made of material with relatively great strength. Iron and hardened synthetic materials or the like may be used for this purpose. In the event that the bodies 23 and 31, or the linings 27, 36, respectively, are made of relatively hard rubber, it will be of advantage to form therein grooves corresponding as to pitch and depth to the respective spring turns.

The feature which distinguishes the spring holding and gripping device of the present invention from previously known devices of this general kind resides in that there is no sudden transition with respect to the spring gripping and holding forces. The thread-like grooves, particularly as they are present in the embodiments according to FIGS. 1 and 2, are of a configuration such that there is no sharp distinction between inactive and operatively effective spring turns. The spring which is statically and dynamically stressed can attach itself to the grooves which become wider and flatter, or lift off from the grooves, depending upon the load placed on the spring. The gripping forces can be continuously adjusted to given operating requirements by the screw adjusting devices shown in the drawings.

The rubber body acting in the embodiments according to FIGS. 3 and 4 as a gripping element is responsive to tightening of the adjusting screw deformed laterally outwardly into pressure engagement with the spring turns, moving also between the spring turns. This provides for a connection of the spring with the parts of the gripping device as to force and configuration thereof.

The cone shaped core 22 used in the embodiment shown in FIG. 3, is operative to provide for a displacement of the cup-shaped rubber body 23 so that the wall thereof increases in thickness in the direction of the part of the spring 1 which is not being gripped. The thicker the wall of the rubber body is, the better will such body coact with the actuation of the spring turns. The gradual transition from the rigid gripping of the spring to the free mobility thereof is thereby benefitted.

Changes may be made within the scope and spirit of the appended claims which define what is believed to be new and desired to have protected by Letters Patent.

We claim:

1. A holding and gripping device for springs which are subjected to tension and to compression, comprising radially outwardly expansible gripping means disposed within a spring in pressure engagement with terminal turns of said spring on the inside thereof, means engageable with said gripping means for adjusting the radially outwardly effective pressure exerted by said gripping means on said spring turns, said gripping device being constructed to exert a reactive force on said spring turns which counters the force exerted by the load on the spring and diminishes progressively in axially extending inward direction toward the spring turns which are free of said gripping means, said gripping device comprising an annular radially outwardly expansible member composed of a plurality of parts, grooves being formed in said parts for receiving the terminal turns of said springs, the width of said grooves increasing and the depth thereof decreasing in the direction of the spring turns which are free of said gripping device.

2. A holding and gripping device for springs which are subjected to tension and to compression, comprising radially outwardly expansible gripping means disposed within a spring in pressure engagement with terminal turns of said spring on the inside thereof, means engageable with said gripping means for adjusting the radially outwardly effective pressure exerted by said gripping means on said spring turns, said gripping device being constructed to exert a reactive force on said spring turns which counters the force exerted by the load on the spring and diminishes progressively in axially extending inward direction toward the spring turns which are free of said gripping means, said gripping device comprising an annular radially outwardly expansible member composed of a plurality of parts, grooves being formed in said parts for receiving the terminal turns of said springs, the width of said grooves increasing and the depth thereof decreasing in the direction of the spring turns which are free of said gripping device, and a fixed tubular member surrounding said spring turns on the outside thereof.

3. A holding and gripping device for springs which are subjected to tension and to compression, comprising radially outwardly expansible gripping means disposed within a spring in pressure engagement with terminal turns of said spring on the inside thereof, means engageable with said gripping means for adjusting the radially outwardly effective pressure exerted by said gripping means on said spring turns, said gripping device being constructed to exert a reactive force on said spring turns which counters the force exerted by the load on the spring and diminishes progressively in axially extending inward direction toward the spring turns which are free of said gripping means, said gripping means comprising a rubber body, screw operated means for adjusting the pressure of said rubber body exerted on said spring turns, and a fixed tubular member lined with rubber and surrounding said spring turns on the outside thereof.

4. A holding and gripping device for springs which are subjected to tension and to compression, comprising radially outwardly expansible gripping means disposed within a spring in pressure engagement with terminal turns of said spring on the inside thereof, means engageable with said gripping means for adjusting the radially outwardly effective pressure exerted by said gripping means on said spring turns, said gripping device being constructed to exert a reactive force on said spring turns which counters the force exerted by the load on the spring and diminishes progressively in axially extending inward direction toward the spring turns which are free of said gripping means, said gripping means comprising a rubber body, screw operated means for adjusting the pressure of said rubber body exerted on said spring turns, a conical core disposed within said rubber body, said core being made of a material having an elasticity less than that of said rubber body, and a fixed tubular member lined with rubber and surrounding said spring turns on the outside thereof.

5. A device according to claim 1, comprising a second annular radially inwardly contractible member composed of a plurality of parts provided with grooves for receiving said terminal turns of said spring on the outside thereof, said grooves likewise increasing in width and decreasing in depth in the direction of the spring turns which are free of said gripping device, and means for adjusting the radially inwardly effective pressure exerted by said second member on the radially outwardly facing sides of said spring turns.

6. A device according to claim 5, wherein the respective adjusting means for said radially outwardly expansible member and said radially inwardly contractible member, comprises an annular conical member, and screw operated means for displacing the respective conical member relative to the annular member cooperating therewith.

7. A device according to claim 1, comprising a second annular radially inwardly contractible member composed of a plurality of parts provided with grooves for receiving said terminal turns of said spring on the outside thereof, said grooves likewise increasing in width and decreasing in depth in the direction of the spring turns which are free of said gripping device, a fixed outer member surrounding said second annular member, and means cooperating with said fixed outer member for adjusting the radially inwardly effective pressure exerted by said second member on the radially outwardly facing sides of said spring turns.

References Cited in the file of this patent

UNITED STATES PATENTS

| | | |
|---|---|---|
| 51,368 | Vose | Dec. 8, 1865 |
| 1,404,464 | Meyer | Jan. 24, 1922 |
| 1,610,770 | Greene | Dec. 14, 1926 |
| 1,644,783 | Lissel | Oct. 11, 1927 |
| 2,646,950 | Nelson et al. | June 18, 1953 |
| 3,041,060 | Jacobsen | June 26, 1962 |

FOREIGN PATENTS

| | | |
|---|---|---|
| 213,725 | Austria | Dec. 29, 1959 |
| 336,633 | Switzerland | Apr. 15, 1959 |